Figure 1:
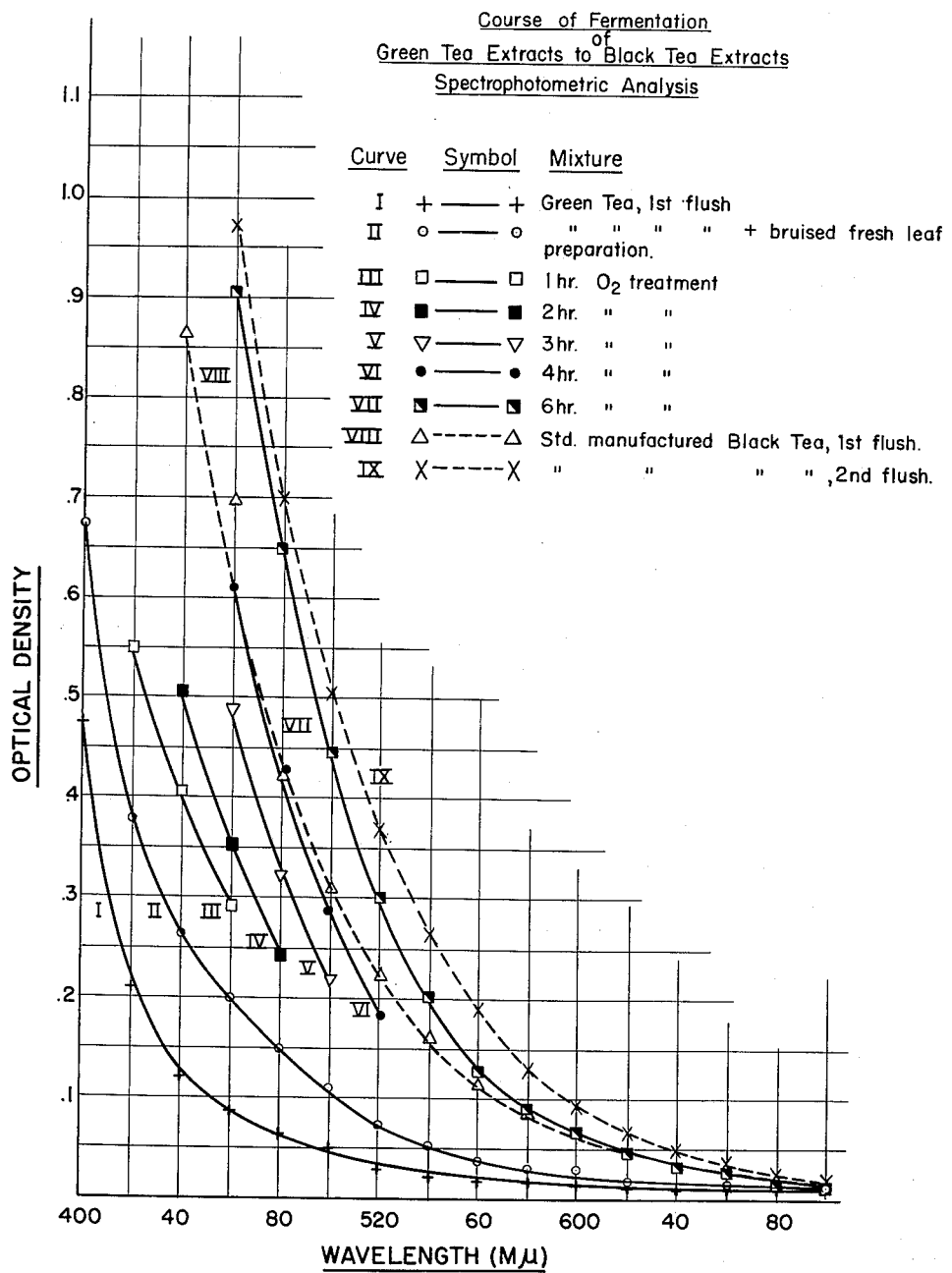

2,975,057
PROCESS FOR CONVERTING GREEN TEA EXTRACT

Edward Seltzer, West Englewood, Arthur J. Harriman, Glen Ridge, and Richard W. Henderson, Rahway, N.J., assignors to Thomas J. Lipton, Inc., Hoboken, N.J., a corporation of Delaware Filed May 23, 1958, Ser. No. 737,269

8 Claims. (Cl. 99—77)

This invention relates to tea and tea extracts and to processes for preparing the same. More particularly, the invention relates to a novel process of preparing a fermented tea extract from green tea and to the product obtained thereby.

Green tea, as the term is employed herein, includes freshly gathered tea leaves, tea leaves which have been freshly gathered and dried immediately, tea leaves which have been heat treated before drying to inactivate the enzymes therein, and aqueous extracts of these leaves. In each instance, the green tea has undergone substantially no fermentation to the "black" state.

Black tea, on the other hand, has been usually prepared by subjecting freshly picked tea leaves to a series of processing conditions including the withering and rolling of freshly harvested leaves, followed by a fermentation step during which the characteristic color, flavor and aroma of black tea are developed. The fermentation is stopped after a suitable period of time, the tea leaves are "fired" to inactivate the enzymes causing the fermentation and the tea is dried. The extent of fermentation varies, in commercial practice, from black to various gradations between green and black. Partially fermented teas are known as "Oolong" teas. The green, Oolong, and black teas have distinctive flavor and color characteristics, in accordance with the particular preferences of consuming groups.

The fermentation processes are generally carried out at or near the tea growing areas and the fermentation conditions vary with local custom and climatic conditions. As a result, the fermented teas of commerce vary greatly in color and quality of flavor, depending upon the area of the world in which they are produced and by whom the process is carried out. A means for standardizing or at least insuring the production of a uniform quality of fermented black tea and of partially fermented varieties from a given green tea has long been sought.

It is an object of the present invention to provide a process whereby black and partially fermented teas can be prepared from water extracts of fresh or manufactured green tea under closely controlled conditions.

Another object of the present invention is to obtain a black tea extract from extracts of green tea, said black tea extract having a greater amount of aroma therein than would be present in black tea leaves produced by natural fermentation.

Another object of this invention is to produce teas of varying degrees of color and flavor from water extracts of fresh or manufactured green tea.

These and other objects of the present invention are achieved by combining an aqueous extract of green tea with a relatively small amount of bruised fresh tea leaves in the presence of oxygen. Conversion of the extract from green to black proceeds at a controlled temperature over a period of time to provide an aqueous material having the color, aroma and flavor of black tea. The process conditions of time, temperature and agitation, as well as the concentration of reactants, may be varied to provide a wide range of color, flavor and aroma characteristics. When the desired characteristics are obtained, the conversion process is arrested, preferably by heating.

As aforementioned, the teas which may be treated according to the invention include freshly harvested green tea leaves and manufactured green tea, the latter being prepared by heating and drying freshly harvested green tea leaves before substantial fermentation has occurred. The heating is preferably done with steam. As a first step in the preferred process, the green tea, either fresh or manufactured, is extracted with water at elevated temperatures to remove substantially all of the desired soluble solids from the tea leaves. The water extracts thus obtained are cooled and are then ready for further processing according to this invention. Because of their somewhat unstable nature over long periods of storage, it is preferred that the extracts be used within a reasonably short time after their preparation.

The bruised fresh tea leaves which are employed with the green tea extracts to bring about the conversion process of this invention are obtained by bruising, macerating, folding, rolling, milling, grinding, or otherwise finely dividing freshly harvested tea leaves. Tea leaves which have been freshly harvested and preserved by refrigeration, freezing, or other means which prevent destruction of the enzymes responsible for fermentative activity may also be employed. The bruising of the leaves serves to release the enzymes present in the leaves which are favorable to the conversion process. Generally speaking the bruising methods which result in finer subdivision of the leaves are preferred, because of the more extensive release of enzymes obtained thereby.

Passing the freshly harvested green tea leaves through rolls to provide the conventional rolled tea leaves has been found to give a suitable bruised tea leaf for use according to this invention. Subdivision of the fresh tea leaves by means of grinding is generally more satisfactory, provided the grinding is carried out under temperature conditions which are sufficiently low to prevent inactivation of the enzymes.

In preparing the bruised fresh tea leaves, it is important that the temperature not exceed about 100° F. so that the desirable enzymes present in the leaves will not be partially or completely inactivated. 80° F. has been found to give generally satisfactory results in instances where a refrigerant such as Dry Ice ($CO_2$) is not employed.

One preferred method of preparing the bruised fresh tea leaves involves the addition of cracked or pulverized Dry Ice ($CO_2$) to the freshly harvested leaves, followed by comminution of the leaves in their frozen state. By this means, the required low temperature conditions are maintained during grinding and at the same time the leaves are made brittle, thus facilitating the grinding thereof.

The temperature at which the process of this invention is carried out should be below about 100° F. At temperatures substantially below 80° F. some degree of fermentation is obtained, but the rate of conversion of the green tea to black tea is considerably reduced.

The mixture of green tea extract and bruised tea leaves is exposed to oxygen for a period of time which may be regulated to provide the color, flavor and aroma of black tea. Conversion for a somewhat lesser time results in a tea extract which contains some of a typically green tea aroma and flavor and which is intermediate in color between green and black. Although not a true black tea, the tea thus prepared is useful as an "Oolong" tea. Over-fermentation, on the other hand, does not generally have an adverse effect on the color of the tea, but will produce flavors and aromas which are considered undesirable. The rate and extent of conversion of green tea to black tea in the process of this invention is a function of time of oxygen contact at a given temperature.

It is also important in the process of this invention that the fermenting extract be continually agitated, so that maximum exposure of the mixture to the oxygen-containing atmosphere is obtained.

The amount of bruised fresh tea leaves employed with the aqueous extract of green tea in the process of this invention may vary, depending upon a number of factors. Generally speaking, a high concentration of bruised tea leaves in the mixture brings about a faster conversion of green tea to black tea. However, a small amount of the bruised tea leaves relative to the green tea extract is generally sufficient to provide an optimum rate of conversion. For example, a 3.6% concentration of soluble solids from fresh tea leaves has been found sufficient to produce a color change nearly equal to that obtained by standard commercial fermentation processes. This will be shown further in the discussion of the attached drawing.

The conversion process is generally stopped by heating the mixture to a temperature and for a time sufficient to inactivate the enzyme content thereof. As afore-mentioned, the inactivation step may be used to govern the color, aroma and flavor characteristics obtained in the extract. For example, where a soluble tea extract having an Oolong color and flavor is desired, the time of fermentation is reduced and the mixture is inactivated after a color conversion approximately half way between green and black is achieved.

The tea extracts obtained according to this invention, when compared with extracts of black tea prepared according to standard commercial methods from the same fresh green tea, are found to have more black tea aroma and a more mellow and mature black tea flavor. These improved characteristics were obtained with a minimum of processing steps and under readily controlled conditions.

The aqueous black tea extract may be used directly with appropriate dilution as a beverage. Where desired, the extract may be concentrated to provide a tea beverage concentrate. Alternatively, the extract may be dried by well-known methods, such as spray drying, belt drying, drum drying, tray drying, and the like, to provide a stable powder.

The invention is further defined by reference to the attached drawing in which:

Figure 1 shows spectrophotometric analyses of a series of tea solutions prepared according to the process of this invention as compared with teas prepared according to conventional fermentation processes.

Referring to Figure 1, in preparing the various samples for spectrophotometric analysis, each of the solutions was diluted to a constant soluble tea solids concentration. Each solution was then microfiltered, analyzed for color characteristics in a spectrophotometer, and also analyzed for the percent of dissolved solids. Where the dissolved solids concentration was found to vary, the optical density readings were corrected to the standard basis.

The curves in Figure 1 follow the color characteristics of tea extracts prepared according to a typical process of this invention. In addition, curves have been added showing the spectrophotometric values obtained from comparable solutions of tea solids prepared according to a standard commercial fermentation process. All of the tea employed in this experiment was obtained from the same variety of tea bush, was harvested at the same time and was obtained either from the first flush (i.e., the first picking, including the bud and top two leaves) or the second flush.

Curve I represents the optical density at varying wave lengths of an aqueous extract of the green tea. This extract was prepared by exposing freshly harvested first flush leaves to live steam (1–2 p.s.i.g.) for five minutes, rolling the steamed leaves lightly, and thereafter drying the leaves. The dried leaves were extracted with boiling filtered tap water and with intermittent agitation for fifteen minutes. The extract was then filtered and cooled to 100° F. The extract contained 2.6% tea solids and was employed in this concentration directly in the fermentation process.

Curve II represents the optical density at varying wave lengths of the green tea extract depicted by curve I immediately after adding bruised fresh tea leaves thereto. The bruised tea leaf preparation was obtained by mixing second flush leaves with pulverized Dry Ice ($CO_2$) and comminuting the leaves in a frozen state in a stainless steel Mikro Pulverizer hammer mill. The bruised leaf preparation was added to the green tea extract in an amount sufficient to provide a ratio of one part bruised leaf soluble solids to twenty-seven parts green tea extract soluble solids.

It will be noticed that the mere addition of the bruised tea leaf preparation to the green tea extract causes an immediate substantial darkening of the mixture.

Curves III, IV, V, VI and VII show the optical density at varying wave lengths of extracts obtained by halting the conversion process after 1, 2, 3, 4 and 6 hours of conversion, respectively. In carrying out the reaction, the bruised leaf was mixed with the green tea extract and the mixture brought to 100° F. in a triple-neck round-bottom flask. Oxygen was swept gently and continuously over the surface of the mixture and the mixture was agitated continually during the process by means of a propeller stirrer.

It will be noted from the curves III to VII that the extract obtained becomes progressively darker in color with increase in conversion time. After 6 hours, the color of the solution exceeded the commercially fermented first flush leaves but did not quite achieve the color of the commercially fermented second flush leaves.

Curves VIII and IX show the optical densities at varying wave lengths of black teas manufactured according to a standard commercial fermentation process from leaves harvested from the same source and at the same time as the other teas described above. Curve VIII relates to first flush leaves, while curve IX relates to second flush leaves.

The processes employed in commercially fermenting the teas of curves VIII and IX varied somewhat. For curve VIII, the first flush leaves were frozen, machine rolled, fermented in room air for eight hours, fired and dried. For curve IX, the second flush leaves were withered naturally for fourteen hours, machine rolled, fermented six and one-half hours in room air, fired and dried.

The invention is further illustrated by the following examples.

*Example 1*

Green first flush tea leaves are exposed to live steam at 1 to 2 pounds per square inch gauge for five minutes, rolled lightly and dried. A green tea extract containing 2.6% soluble tea solids is then made from the dried leaves by extraction with boiling water with intermittent agitation for fifteen minutes. The extract is filtered to remove undissolved solids and the solution cooled to 100° F.

A bruised fresh tea leaf preparation is then provided by mixing and cutting freshly harvested second flush tea leaves in a Waring Blendor with a small amount of the green tea extract prepared above. The bruised leaf preparation is then added to the green tea extract in an amount sufficient to give a ratio in the mixture of one part soluble solids from bruised tea leaves to ten parts soluble solids of the green tea extracts.

The mixture is then placed in a triple-neck, round-bottom flask seated in an electrically-heated mantle, brought to 100° F. and allowed to react. During the reaction, the mixture is agitated with a propeller stirrer, creating a vortex or cavity in the liquid. Oxygen is swept gently and continuously over the surface of the mixture during the conversion process.

After four hours, the mixture is heated to 160° F. for five minutes to inactivate the enzymes and filtered through glass wool.

The extract thus prepared has the same color intensity and spectrophotometric analysis as an extract prepared from black tea which had been fermented according to the standard commercial fermentation process described above from the same source of second flush tea harvested at the same time. Furthermore, the flavor and aroma of the liquid concentrate prepared according to this example is improved over that obtained by the commercial process. The process of this example gives a tea beverage having a more mellow and mature black tea flavor and the aroma thereof appears to be of greater intensity.

A portion of this extract is concentrated under vacuum to provide a liquid tea beverage concentrate. The remainder of the extract is dried on a vacuum drum dryer to provide a dry concentrate in flake form. Reconstitution of the dry concentrate provides a black tea beverage of excellent quality.

*Example 2*

Freshly harvested first flush tea leaves are exposed to live steam at 1 to 2 pounds per square inch gauge for five minutes, rolled lightly and dried. A green tea extract containing 2.6% soluble tea solids is made from the dried leaves by extraction with hot water started at a boil with intermittent agitation for fifteen minutes. The extract is filtered to remove undissolved solids and the solution cooled to 100° F.

A bruised fresh tea leaf preparation is obtained by mixing freshly harvested second flush tea leaves with pulversized Dry Ice ($CO_2$) and passing the mixture through a stainless steel Mikro Pulverizer hammer mill equipped with twelve flat-edged blades and a .013 inch herringbone screen. 36.6 grams of the thus bruised tea leaves (containing about 70% moisture) are added to 510 cc. of the green tea extract containing 2.6% soluble solids. This amounts to a ratio of one part soluble solids from bruised tea leaves to 27.1 parts soluble solids from the green tea extract and a percentage concentration of bruised leaf soluble solids in the mixture of about 3.6%.

The mixture is then placed in a triple-neck, round-bottom flask seated in an electrically-heated mantle, brought to 100° F. and allowed to react. The mixture is agitated with a propeller stirrer. Air is swept gently and continuously over the surface of the mixture during the fermentation process.

After four hours, the mixture is heated to 160° F. for five minutes to inactivate the enzymes and filtered through glass wool.

The extract thus prepared has the same color intensity and spectrophotometric analysis as an extract prepared from black tea which has been fermented according to the standard commercial fermentation process described above from the same source of second flush tea harvested at the same time. Furthermore, the flavor and aroma of the liquid concentrate prepared according to this example are improved over that obtained by the commercial process. The process of this example gives a tea beverage having a more mellow and mature black tea flavor and the aroma appears to be of greater intensity.

A portion of this extract is concentrated under vacuum to provide a liquid tea beverage concentrate. The remainder of the extract is dried on a vacuum drum dryer to provide a dry concentrate in flake form. Reconstitution of the dry concentrate provides a black tea beverage of excellent quality.

*Example 3*

100 grams of dry green tea is placed in 1000 ml. of boiling distilled water. After occasional stirring for fifteen minutes during which the temperature drops to 175° F., the extract is filtered through cheesecloth and the leaves squeezed by hand for maximum yield of extract. The extract thus obtained contains approximately 3% soluble tea solids.

A macerate of freshly picked tea leaves is prepared by crushing the leaves with mortar and pestle. The macerate is added to the green tea extract in the amount of 1% by weight of the extract. The slurry thus obtained is subjected to continued agitation at 80° F. in an atmosphere of oxygen for three hours. At the end of this time, the slurry is heated to 160° F. for five minutes to inactivate the enzymes and is then filtered.

The extract thus prepared has a color and flavor similar to commercial Oolong tea. The extract is dried in a spray dryer to provide a free-flowing powdered tea extract. When reconstituted, the extract is of very high quality and is considered to be superior in flavor characteristics to extracts prepared from commercial varieties of Oolong tea in the usual manner.

*Example 4*

Green first flush leaves are extracted with boiling distilled water using a ratio of water to leaf solids (dry basis) of 10:1. The leaves are held in the boiling distilled water with intermittent agitation for fifteen minutes, the extract filtered, and then cooled to 100° F. The extract thus obtained contains about 2.6% tea solids.

A bruised fresh tea leaf preparation is obtained from freshly harvested first flush tea leaves of the same source as those extracted above. These tea leaves are mixed with pulverized Dry Ice ($CO_2$) and the mixture passed through a stainless steel Mikro Pulverizer hammer-mill equipped with twelve flat-edged blades and an .013 inch herringbone screen. The resulting finely cut leaf is mixed with a portion of the extract obtained above in an amount sufficient to provide the ratio of fresh leaf solids to extract soluble solids of 1:10.

The mixture of extract and finely divided fresh leaf is placed in a triple-neck round bottom flask seated in an electrically heated mantle, and brought to a temperature of 100° F. Oxygen is swept gently and continually over the surface of the mixture during the fermentation process, and the mixture is continually agitated with a propeller stirrer.

After five hours, the mixture is heated to 160° F. for five minutes to inactivate the enzymes and filtered through glass wool.

The extract thus prepared has a color intensity and spectrophotometric analysis indicating that the color development obtained according to this process is in excess of that obtained from an extract prepared from black tea which has been fermented according to standard commercial fermentation process described above from the same source of first flush tea leaves, harvested at the same time. Furthermore, the flavor and aroma of the liquid concentrate are improved over that obtained by the commercial process.

A portion of this extract is concentrated under vacuum to provide a liquid tea beverage concentrate. The remainder of the extract is dried on a vacuum drum drier to provide dry concentrate in flake form. Reconstitution of the dry concentrate provides a black tea beverage of excellent quality.

It is understood that the foregoing examples are illustrative only and that modifications will occur to those skilled in the art. Therefore, the invention is not to be limited thereto but is to be defined by the appended claims.

We claim:

1. The process of converting green tea comprising adding an effective amount of an aqueous suspension of bruised fresh tea leaves, said leaves having their natural complement of enzymes in an active state, to an aqueous extract of green tea, allowing the mixture to react in the presence of oxygen at a temperature below that at which substantial inactivation of the natural tea enzymes occurs, and thereafter heating the mixture to stop the reaction and stabilize the mixture against further change.

2. The process of converting green tea extract to an extract having the properties of black tea comprising the steps of preparing a water extract of green tea, adding to the extract an effective amount of an aqueous suspension of bruised fresh tea leaves, said leaves having their natural complement of enzymes in an active state, allowing the mixture to react in the presence of oxygen at a temperature below that at which substantial inactivation of the natural tea enzymes occurs, and thereafter heating the mixture to stop the reaction and stabilize the mixture against further change.

3. The process of converting green tea extract to an extract having the properties of black tea comprising extracting green tea with water, adding an effective amount of an aqueous suspension of bruised fresh tea leaves to the extract, said leaves having their natural complement of enzymes in an active state, agitating the mixture in the presence of oxygen at a temperature below about 100° F. for a period of time sufficient to achieve the desired degree of color, flavor and aroma development, and thereafter heating the mixture to stop the reaction and stabilize the mixture against further change.

4. The process of claim 3 wherein the resulting extract is dried to form a powdered extract of tea.

5. The process of claim 3 wherein the resulting extract is filtered and concentrated to form a liquid tea beverage concentrate.

6. The process of converting an aqueous green tea extract to a black tea extract comprising adding an effective amount of an aqueous suspension of finely divided freshly harvested tea leaves to said green tea extract, said leaves having their natural complement of enzymes in an active state, allowing the mixture to react with agitation in the presence of oxygen at a temperature below that at which substantial inactivation of the natural tea enzymes occurs, and thereafter heating the mixture to stop the reaction.

7. The process of converting an aqueous green tea extract to an extract having the properties of black tea comprising adding an effective amount of an aqueous suspension of finely divided freshly harvester tea leaves to said green tea extract, said leaves having their natural complement of enzymes in an active state, allowing the mixture to react at temperatures below 100° F. with agitation in the presence of oxygen for a time sufficient to develop the black tea color, aroma and flavor desired and thereafter heating the mixture to inactivate the enzymes present therein.

8. The process of converting green tea extract to an extract having the properties of black tea comprising preparing an aqueous extract of green tea, adding an aqueous suspension of bruised fresh tea leaves to the extract, said leaves having their natural complement of enzymes in an active state, agitating the mixture in the presence of oxygen at a temperature below about 100° F. for a period of time sufficient to achieve the desired degree of color, flavor and aroma development, and thereafter heating the mixture to stop the enzyme reaction and to stabilize the mixture against further change, said bruised, fresh tea leaves being present in the reaction mixture at a level sufficient to provide approximately a 3.6% concentration of soluble solids in the extract attributable to fresh tea leaves.

References Cited in the file of this patent
UNITED STATES PATENTS
2,863,775    Perech _____ Dec. 9, 1958